3,102,385
VARIABLE AREA CONVERGING-DIVERGING EXHAUST NOZZLE FOR A BYPASS ENGINE
Charles E. Lyons, Manchester, Conn., assignor, by mesne assignments, to the United States of America as represented by the Secretary of the Air Force
Filed May 21, 1957, Ser. No. 660,725
4 Claims. (Cl. 60—35.6)

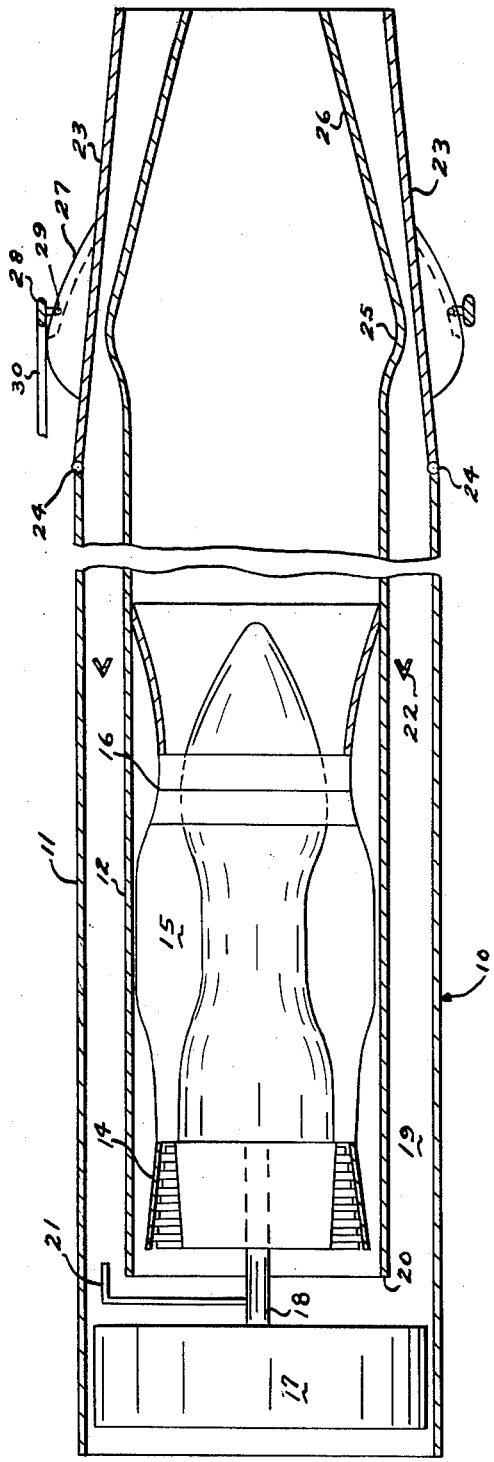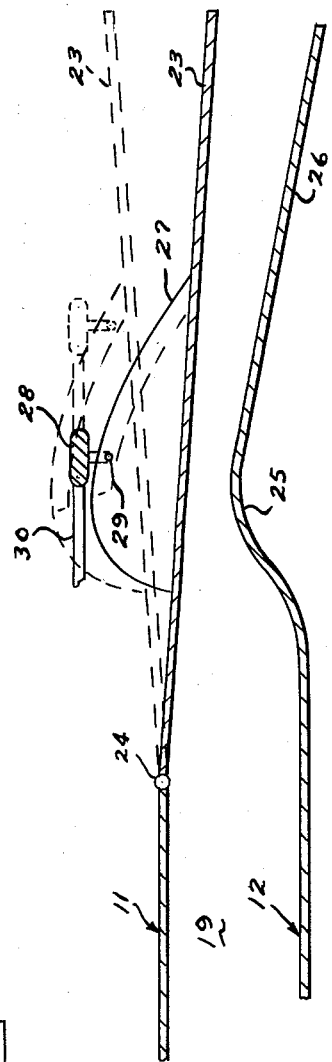

This invention relates to a gas turbine engine and, more particularly, to a gas turbine engine of the bypass type. In a bypass type of gas turbine engine, a portion of the air entering the engine is bypassed around the compressor, the combustion stage, and the turbine of the gas turbine engine. The air flowing through this bypass duct adds thrust to the thrust produced within the combustion stage portion of the engine. The present invention provides a device for varying the thrust by varying the outlet area of the bypass duct. Similarly, the thrust under some situations may be maintained substantially constant by varying the outlet area of the bypass duct when the mass of air flowing through the bypass duct is changed.

An object of this invention is to increase the efficiency of a bypass gas turbine engine.

Another object of this invention is to provide a converging-diverging nozzle for the bypass air flowing from a bypass gas turbine engine.

Other objects of this invention will be readily perceived from the following description.

This invention relates to a gas turbine engine of the bypass type comprising a compressor, a combustion stage, and a turbine. The engine also has a bypass duct to divert a portion of the air entering the engine around the compressor, the combustion stage, and the turbine. The bypass duct has an exhaust nozzle, which has its shape varied from converging to diverging by suitable means.

The attached drawing illustrates a preferred embodiment of the invention, in which FIG. 1 is a sectional view, partly in elevation, of a bypass gas turbine employing the present invention; and FIG. 2 is an enlarged sectional view of a portion of the device of FIG. 1.

Referring to the drawing and particularly FIG. 1, there is shown a gas turbine engine 10 of the bypass type. The engine 10 includes an inner shell 12 surrounded by an outer shell 11. The inner shell 12 has a high pressure compressor section 14, a combustion stage 15, and a turbine 16 therein to develop thrust in the well-known manner. The high pressure compressor section 14 is driven by the high pressure portion of the turbine 16 by a shaft.

All of the air entering the engine 10 flows through a low pressure compressor section 17, which is driven by the low pressure portion of the turbine 16 through a shaft 18. A portion of the air passing through the compressor 17 flows through the compressor 14, the combustion stage 15, and the turbine 16 into the exhaust portion of the inner shell 12. The remainder of the air flows into an annular duct 19, which is formed between the inner shell 12 and the outer shell 11, to bypass the air around the compressor 14, the combustion stage 15, and the turbine 16. The inlet end of the inner shell 12 is spaced from the low pressure compressor 17 to form an inlet opening 20 for the air to flow into the annular duct 19.

A fuel slinger 21 is mounted on the shaft 18 to supply fuel to the annular bypass duct 19 to mix with the air flowing therethrough. A plurality of flameholders 22 is mounted in the annular bypass duct 19 to ignite the fuel and air mixture flowing therethrough.

The outer shell 11 has a plurality of leaves 23 pivotally secured at 24 to the outlet end of the outer shell 11. As clearly shown in FIG. 2, the inner shell 12 extends beyond the outlet end of the outer shell 11 to cooperate with the leaves 23 to form a nozzle for the air flowing from the bypass duct 19. The portion of the inner shell 12 extending beyond the outer shell 11 has a section 25 of increasing diameter and a section 26 of decreasing diameter. When the nozzle leaves 23 are moved to their innermost position (solid lines of FIG. 2), the shape of the nozzle formed between the leaves and the inner shell 12 is convergent whereas when the nozzle leaves are moved to a point beyond the dotted line position of FIG. 2, the nozzle has a divergent shape. Thus, the shape of the nozzle may be varied from converging to diverging depending on the desired exit velocity and the mass flow through the bypass duct 19.

Each of the nozzle leaves 23 has a cam 27 secured thereto. All of the nozzle leaves 23 are joined together by a unison ring 28, which has a projecting portion 29 cooperating with the cam 27 of each leaf 23. The unison ring 28 has an actuator 30 connected thereto to move the nozzle leaves 23 through the projecting portions 29 and the cooperating cams 27.

When the nozzle leaves 23 are in the position shown in solid lines in FIG. 2, the outlet area of the bypass duct 19 is reduced to a minimum. Such a condition is desired, for example, when the mass flow of air through the bypass duct is reduced and it is desired to maintain the velocity. To reduce the thrust of the mass flowing from the bypass duct 19 without reducing the mass flowing therethrough, it is necessary to reduce the velocity; this is accomplished by increasing the outlet area. The forward speed of the aircraft in which the engine is employed and the throttle speed of the engine are both variable factors that determine the mass of air flowing through the bypass duct 19. The present invention has the advantage of providing a variable throat area for the bypass duct, a variable downstream area, and a variable area of divergence merely through the use of the nozzle leaves 23 with the particular configuration of the inner shell 12.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

1. A bypass gas turbine engine comprising a compressor, a combustion stage, a turbine, a bypass duct to divert a portion of the air entering the engine around the compressor, the combustion stage, and the turbine, said bypass duct having an exhaust nozzle with a throat section and a first portion forward of said throat section variable between a converging and a diverging condition, and a second portion aft of said throat section of variable, divergent area, and means to vary the shape of the nozzle in the first portion thereof forward of said throat section from converging to diverging.

2. A bypass gas turbine engine comprising an inner shell, an outer shell surrounding the inner shell and spaced therefrom to form an annular duct therebetween, said inner shell having a compressor, a combustion stage, and a turbine therein, said annular duct communicating with said inner shell only adjacent the air entrance of the engine to divert a portion of the air entering the engine into the annular duct, and means to vary the outlet area of the annular duct comprising a plurality of relatively elongated, circumferentially disposed pivotally mounted exhaust nozzle elements surrounding said inner shell adjacent one end thereof and movable between diverging and converging positions forward of a predetermined point of reduced diameter relative to said annular duct.

3. A bypass gas turbine engine comprising an inner shell, an outer shell surrounding said inner shell and spaced therefrom to form a duct therebetween, said inner shell having a compressor, a combustion stage, and a turbine therein, said duct communicating with said inner shell adjacent the air entrance of the engine to divert a portion of the air entering the engine into the duct, said outer shell including an exhaust nozzle having a plurality of leaves pivotally mounted thereon at its outlet end, said inner shell extending beyond the outlet end of the outer shell, the portion of said inner shell extending beyond said outer shell including a section of increasing diameter and a section of decreasing diameter, and means to move said leaves between a converging position and a diverging position adjacent to and forward of the section of increasing diameter to cooperate with the section of decreasing diameter of the inner shell to vary the outlet area of the duct and the exhaust velocity of the diverted air through said nozzle forward of said increasing diameter section in accordance with the predetermined converging or diverging position of said plurality of leaves.

4. A bypass gas turbine engine comprising an inner shell, an outer shell surrounding said inner shell and spaced therefrom to form a duct therebetween, said inner shell having a compressor, a combustion stage, and a turbine therein, said duct communicating with said inner shell adjacent the air entrance of the engine to divert a portion of the air entering the engine into the duct, said outer shell having a plurality of leaves pivotally mounted thereon at its outlet end, said inner shell extending beyond the outlet end of the outer shell, the portion of said inner shell extending beyond said outer shell including a section of increasing diameter and a section of decreasing diameter, said leaves cooperating with said inner shell to form an exhaust nozzle for the duct, and means to move said leaves to vary the shape of the nozzle forward of the section of increasing diameter from converging to diverging comprising a cam element incorporated on each of said plurality of leaves, an unrestrained unison ring element peripherally disposed relative to said plurality of leaves and having a plurality of projecting elements in engagement with each of said cam elements, and an actuator affixed to said ring element to move said ring element and said plurality of leaves between an outer and an inner position.

References Cited in the file of this patent

UNITED STATES PATENTS

| | | |
|---|---|---|
| 2,603,062 | Weiler et al. | July 15, 1952 |
| 2,672,726 | Wolf et al. | Mar. 23, 1954 |
| 2,693,078 | Laucher | Nov. 2, 1954 |
| 2,770,944 | Jordan | Nov. 20, 1956 |
| 2,780,056 | Colley | Feb. 5, 1957 |
| 2,798,360 | Hazen et al. | July 9, 1957 |